US005461210A

United States Patent [19]

Matsutani et al.

[11] Patent Number: 5,461,210

[45] Date of Patent: Oct. 24, 1995

[54] METHOD OF MANUFACTURING A SPARK PLUG ELECTRODE

[75] Inventors: Wataru Matsutani; Junichi Kagawa, both of Nagoya, Japan

[73] Assignee: NGK Spark Plug Co., Ltd., Nagoya, Japan

[21] Appl. No.: 265,003

[22] Filed: Jun. 24, 1994

Related U.S. Application Data

[62] Division of Ser. No. 997,565, Dec. 28, 1992, abandoned.

[30] Foreign Application Priority Data

Dec. 27, 1991 [JP] Japan .................................... 3-346901
May 7, 1992 [JP] Japan .................................... 4-114809

[51] Int. Cl.⁶ ............................ B23K 26/00; H01T 21/02

[52] U.S. Cl. ............................................ 219/121.64; 445/7

[58] Field of Search ......................... 219/121.63, 121.64, 219/121.65, 121.66; 445/7; 148/525; 313/141; 420/456, 467, 468

[56] References Cited

U.S. PATENT DOCUMENTS

| | | | |
|---|---|---|---|
| 3,407,326 | 10/1968 | Romine | 313/141 |
| 4,488,081 | 12/1984 | Kondo et al. | 313/141 |
| 4,670,684 | 6/1987 | Kagawa et al. | 313/141 |
| 4,699,600 | 10/1987 | Kondo | 445/7 |
| 4,743,793 | 5/1988 | Toya et al. | 313/141 |
| 4,771,210 | 9/1988 | Mohle et al. | 313/141 |
| 4,803,395 | 2/1989 | Matesco | 313/141 |
| 4,840,594 | 6/1989 | Moore | 445/7 |
| 4,902,416 | 2/1990 | Kagawa et al. | 445/7 |
| 4,963,112 | 10/1990 | Benedikt et al. | 445/7 |
| 5,273,474 | 12/1993 | Oshima et al. | 445/7 |
| 5,320,569 | 6/1994 | Oshima et al. | 445/7 |
| 5,347,193 | 9/1994 | Oshima et al. | 313/141 |

FOREIGN PATENT DOCUMENTS

| | | | |
|---|---|---|---|
| 3433683 | 6/1985 | Germany . | |
| 58-59099 | 4/1983 | Japan | 219/121.63 |
| WO8901717 | 2/1989 | WIPO . | |

*Primary Examiner*—Geoffrey S. Evans
*Attorney, Agent, or Firm*—Sughrue, Mion, Zinn, Macpeak & Seas

[57] ABSTRACT

A method of manufacturing a spark plug electrode, wherein a composite column is provided to have a heat-conductor core embedded in a metallic clad by means of extrusion. A firing tip is provided from a slug which is made of a noble metal. The slug is concentrically placed on an end surface of the metallic clad, and a laser beam welding is applied on the slug to thermally melt the entire the slug so that the end surface of the metallic clad is partly fused into the slug in the range of 0.5 wt % to 80.0 wt %.

10 Claims, 10 Drawing Sheets

METHOD OF MANUFACTURING A SPARK PLUG ELECTRODE

This is a divisional of application Ser. No. 07/997,565, filed Dec. 28, 1992, now abandoned.

BACKGROUND OF THE INVENTION

Field of the Invention

This invention relates to plug and a method of manufacturing a spark plug electrode in which an erosion-resistant firing tip is welded to a front end of a composite electrode.

In a spark plug for an internal combustion engine, a firing tip is welded to a front end of a center electrode or a ground electrode.

In order to impart a spark erosion-resistant property with the front end of the center electrode or the ground electrode, it is known that the front end of the electrode is made of nickel-based alloy, while the firing tip is made of a noble metal such as platinum, palladium, iridium and alloys thereof. The firing tip is usually secured to the front end of the center electrode or the ground electrode by means of electrical resistance welding so as to form a dispersion layer at an interface between the firing tip and the front end of the center electrode.

When the electrode is alternately exposed to the heat-and-cool cycle in a combustion chamber of an internal combustion engine, a thermal stress repeatedly occurs at the interface between the firing tip and the front end of the electrode due to the difference of thermal expansion therebetween. The thermal stress is likely to concentrate on the interface to develop cracks so that the firing tip falls off the front end of the electrode with the passage of time while the spark plug is in service.

Therefore, it is an object of the invention to provide an electrode for a spark plug and a method of manufacturing the electrode in which a firing tip is secured to a front end of the electrode by means of laser welding to fuse the firing tip into the front end of the electrode sufficiently, and thus effectively preventing the firing tip from inadvertently falling off the electrode so as to contribute to an extended service life with relatively low cost.

SUMMARY OF THE INVENTION

According to the invention, there is provided a method of making a spark plug electrode. A laser beam welding is applied on a firing tip to thermally melt the entire firing tip so that an end surface of a metallic clad is partly fused into the firing tip in the range of 0.5 wt % to 80.0 wt %. This makes it possible to diminish the difference of the thermal expansion between the firing tip and the end surface of the metallic clad. The firing tip is positively fused into the end surface of the metallic clad to increase the welding strength between the firing tip and the end surface of the metallic clad. The laser beam welding is carried out such that a cone-shaped interface is formed between the firing tip and the end surface of the metallic clad so as to decentralize the thermal stress which occurrs at the interface between the firing tip and the end surface of the metallic clad when the electrode is alternately exposed to heat-and-cool cycle in a combustion chamber of an internal combustion engine.

With these advantages effectively combined, it is possible to effectively prevent the firing tip from inadvertently falling off the end surface of the metallic clad.

These and other objects and advantages of the invention will be apparent upon reference to the following specification, attendant claims and drawings.

DETAILED DESCRIPTION OF THE EMBODIMENTS

Figure 1:
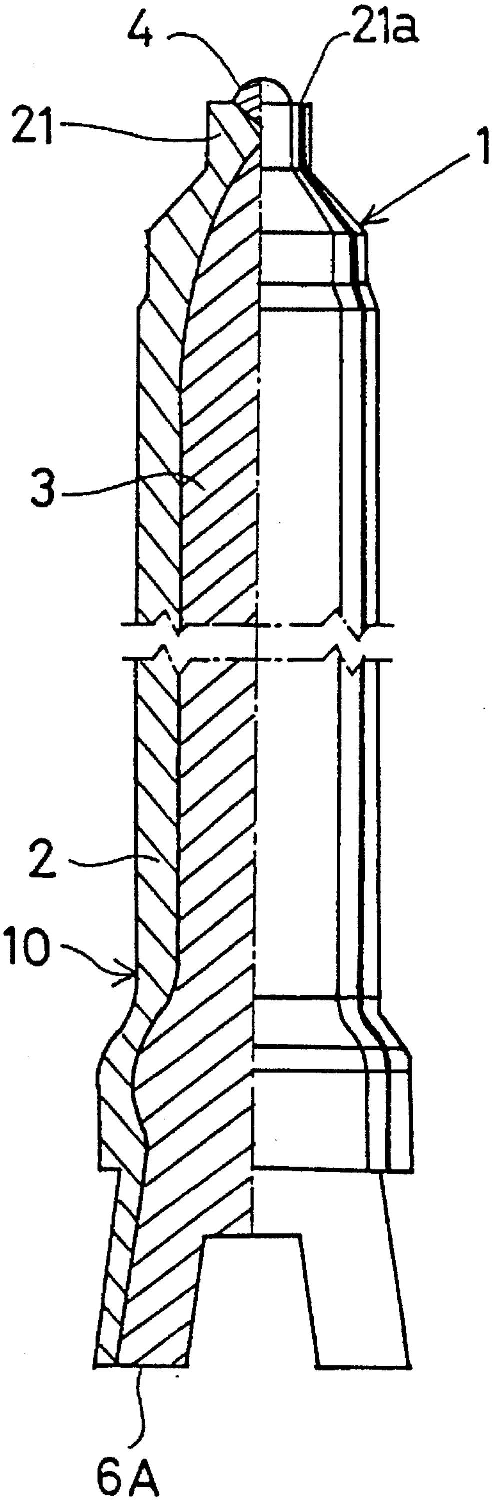
FIG. 1 is an enlarged longitudinal cross sectional view of a center electrode according to a first embodiment of the invention.

Referring to FIG. 1 which shows a center electrode 1 for use in a spark plug of an internal combustion engine, the center electrode 1 has a composite column 10 and a firing tip 4 secured to a front end of the composite column 10. The composite column 10 has a nickel-alloyed clad 2 (2.5 mm in diameter) which includes 15.0 wt % chromium iron and 8.0 wt % iron. In the nickel-alloyed clad 2, is a heat-conductor core 3 (1.3 mm in diameter) concentrically embedded which is made of copper or silver. A front end portion of the nickel-alloyed clad 2 is diametrically reduced to provide a straight neck portion 21 (1.0 mm in diameter). The firing tip 4 is concentrically placed on a front end surface 21*a* of the straight neck portion 21, and secured to the front end surface 21*a* by means of a laser beam welding. The firing tip 4 is made of a platinum-based alloy which includes 20.0 wt % iridium. At the time of carrying out the laser beam welding, entire the firing tip 4 is thermally melted so that the straight neck portion 21 is partly fused into the firing tip 4 in the range of 0.5 wt % to 80.0 wt %.

It is observed that the firing tip may be made of an alloy of nickel (Ni) and iridium (Ir). The firing tip may be made of a cermet including platinum (Pt), iridium (Ir) and rare earth metal, or otherwise a cermet including platinum (Pt), iridium (Ir) and an oxide of rare earth metal. It is also noted that the firing tip may be made from pellet or powder.

It is also observed that the composite column 10 is integrally made of a single elongated blank metal.

Figure 2C:
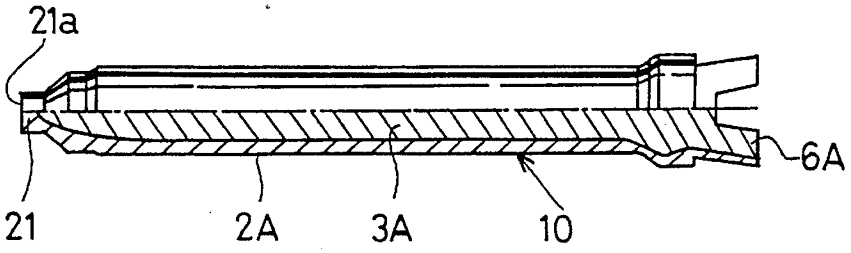
FIGS. 2*a* through 2*c* are sequential process views showing how the center electrode is manufactured.
Figure 2B:
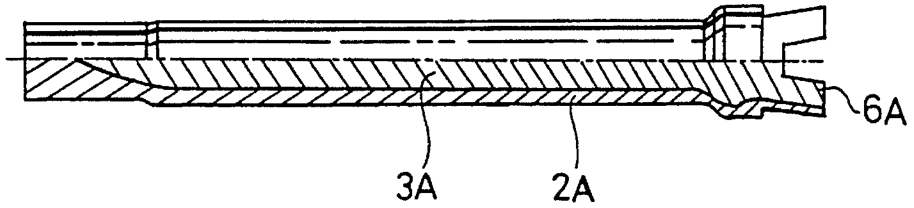
Figure 2A:
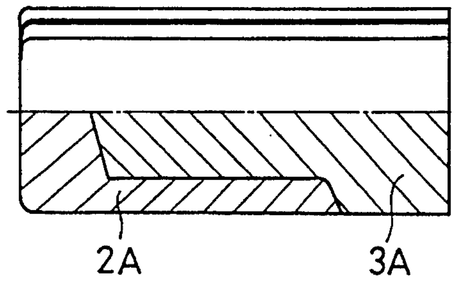

The center electrode 1 thus assembled is manufactured as follows:

(1) A copper core 3A is interfitted into a cup-shaped blank 2A which is to be finished into the nickel-alloyed clad 2 as shown in FIG. 2*a*.

(2) In order to provide the composite column 10, the cup-shaped blank 2A and the copper core 3A are elongated by means of four or six extrusion or swaging steps as shown in FIG. 2*b*. In this process, a rear end of the copper core 3A is extruded into a cruciform configuration 6A.

It is noted that the composite column 10 is integrally made of a single elongated blank metal.

(3) A front end of the cup-shaped blank 2A is diametrically reduced to form the straight neck portion 21 as shown in FIG. 2*c*. In this process, the straight neck portion may be made by milling the front end of the cup-shaped blank.

Figure 3A:
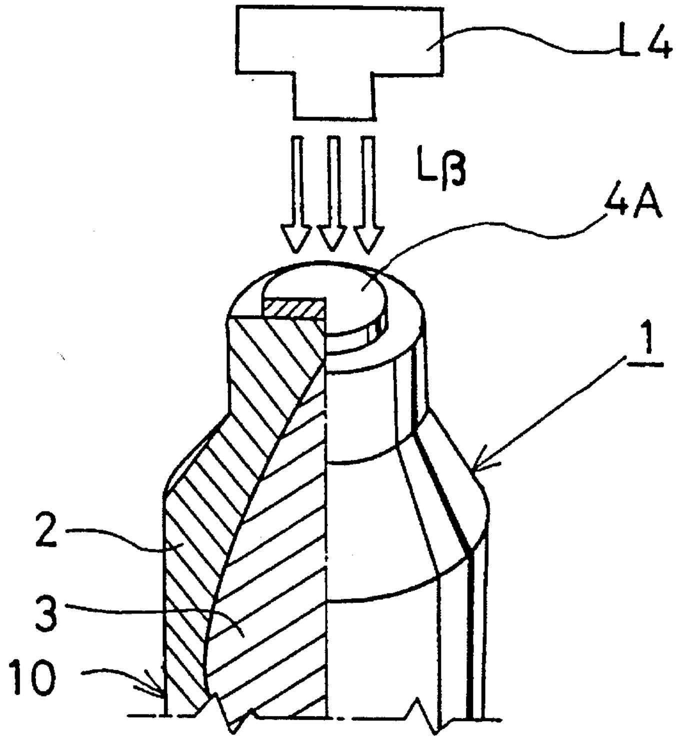
FIGS. 3*a* and 3*b* are perspective views showing how a firing tip is secured to a straight neck portion of a metallic clad when a laser welding is carried out.
Figure 3B:
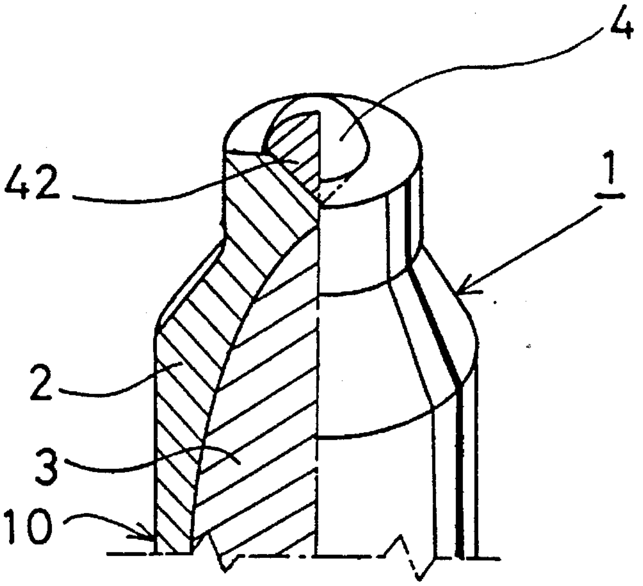

(4) On a front end surface 21*a* of the straight neck portion 21, is a slug 4A concentrically placed which measures 0.9 mm in diameter and 0.2 mm in thickness. Then the slug 4A is secured to the front end surface 21*a* of the straight neck portion 21 by means of the laser beam welding as shown in FIG. 3*a*. In this instance, a recess may be provided on the front end surface 21*a* of the straight neck portion 21 to facilitate placement of the slug 4A. At the time of welding the slug 4A, laser beams (Lβ) are directed straightly or slantwisely from above the slug 4A with a distance of such 4.0 mm (underfocus) from the slug 4A as shown in FIGS. 3*a*, 3*b*. The laser beams (Lβ) are released by energizing a laser beam device L4 with a power source of 340 V, and shot once or several times with a width of pulse of such 9.0 ms. The laser beams (Lβ) are such that the whole slug 4A is thermally melted, and the straight neck portion 21 is partly fused into the slug 4A in order to provide the firing tip 4.

Figure 4:
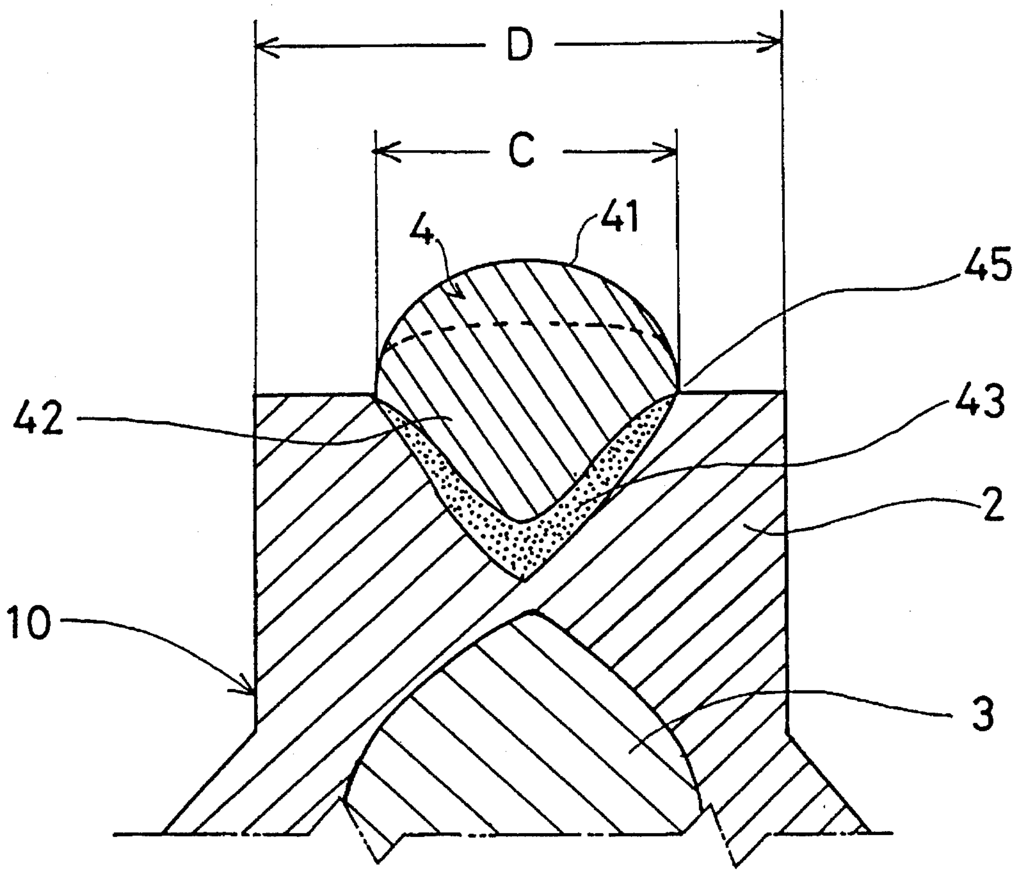
FIG. 4 is an enlarged longitudinal cross sectional view of a main part of the center electrode.

The firing tip 4 has a semi-spherical or or frustoconical head 41 as shown at solid line and dotted lines in FIG. 4. The firing tip 4 further has a wedge-shaped base foundation 42 stuck in the front end surface 21*a* of the straight neck portion 21 to form a cone-shaped or bullet-shaped interface 45 between the base foundation 42 and the front end surface 21*a* of the straight neck portion 21. This makes it possible to enlarge a welding area between the base foundation 42 and the front end surface 21*a* of the straight neck portion 21 so as to increase the welding strength compared to a welding area made by means of electrical resistance welding.

In this instance, the straight neck portion 21 is partly fused into the firing tip 4 in the range of 0.5 wt % to 80.0 wt %. At the same time, a dispersion layer 43 is formed at the interface 45, a thickness of which extends from several μm to several hundreds of μm. In the dispersion layer 43, a dispersion degree of the noble metal of the firing tip 4 decreases as one mores away from the base foundation 42. The optimum range of 0.5 wt % to 80.0 wt % is obtained by alternately changing the laser welding condition and analysing the firing tip 4 repeatedly through an X-ray examination.

With the fusion of the straight neck portion 21 into the firing tip 4, it is possible to diminish the difference of thermal expansion between the firing tip 4 and the straight neck portion 21 of the nickel-alloyed clad 2. Due to the diminished difference of thermal expansion between the firing tip 4 and the straight neck portion 21, the thermal stress which occurs at the interface 45 decreases, and the thermal stress is decentralized due to the geometrical configuration of the interface 45 between the base foundation 42 of the firing tip 4 and the straight neck portion 21 of the nickel-alloyed clad 2.

With those advantages effectively combined, it is possible to prevent the thermal stress from developing into cracks at the interface 45 between the base foundation 42 of the firing tip 4 and the straight neck portion 21 of the nickel-alloyed clad 2.

In order to cope with erosion and the thermal stress to which the firing tip 4 is exposed, the dimensional relationship between a diameter (C) of the firing tip 4 and a diameter (D) of the straight neck portion 21 is as follows:

$$0.3\ \text{mm} \leqq C \leqq D$$

The lower limit of the diameter (C) of the firing tip 4 is determined by considering endurance experiment test results as described in detail hereinafter.

Figure 5:
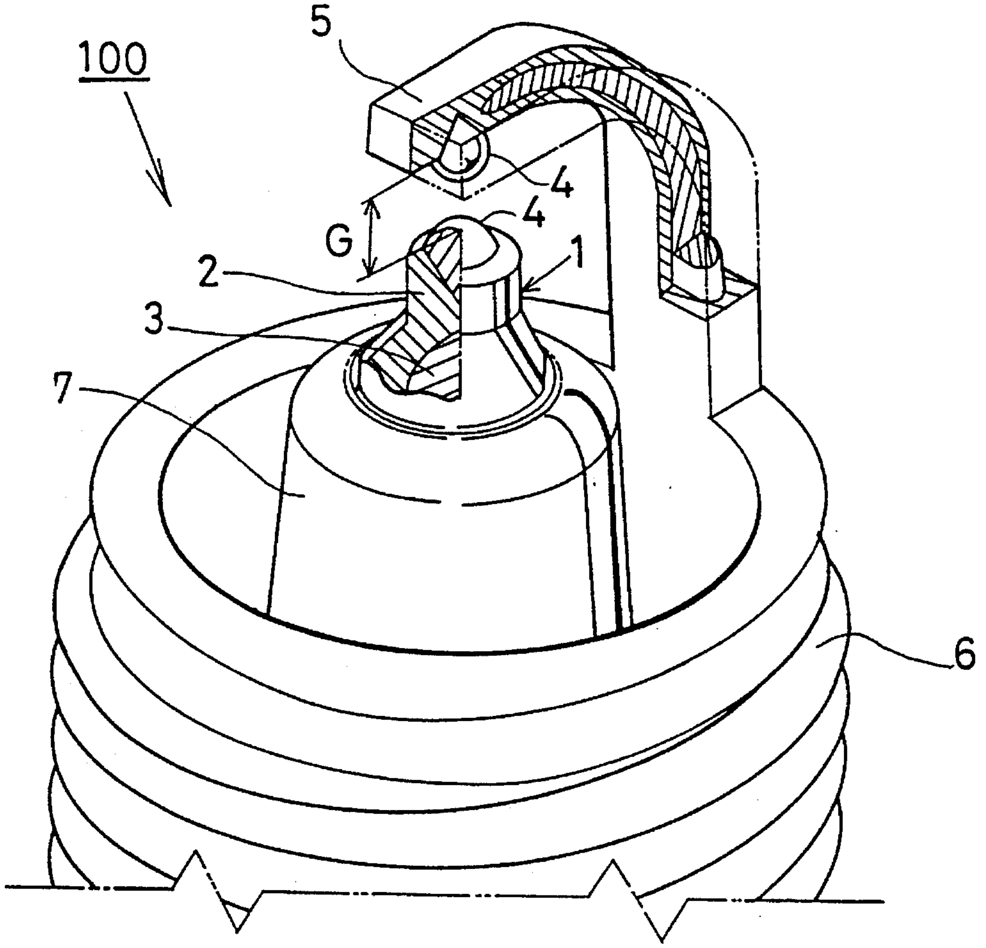
FIG. 5 is a perspective view of a main part of a spark plug to which the center electrode is employed.

FIG. 5 shows a front portion of a spark plug into which the center electrode 1 is incorporated. The spark plug 100 has a metallic shell 6 in which a tubular insulator 7 is placed. Within an inner space of the insulator 7, is the center electrode located. From a front end of the metallic shell, is a ground electrode 5 extended to form a spark gap (G) between the ground electrode 5 and the firing tip 4. With this structure, the firing tip 4 has a thermally transferable relationship with the heat-conductor core 3, a metallic packing (not shown), the metallic shell. 6, a metallic gasket (not shown) and a cylinder head of the internal combustion engine.

Figures 6A, 6B:
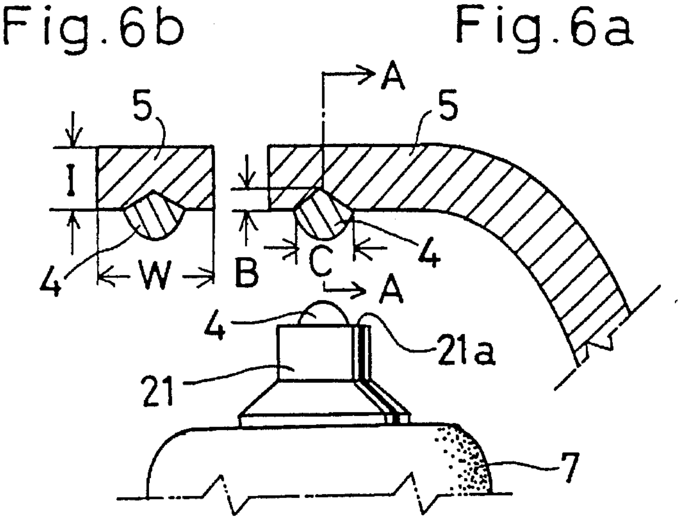
FIG. 6*a* is a longitudinal cross sectional view of a front part of the center electrode according to a second embodiment of the invention.
FIG. 6*b* is a cross sectional view taken along the line A—A of FIG. 6*a;*

FIGS. 6*a*, 6*b* show a second embodiment of the invention. In this embodiment, the slug 4A is placed on the ground electrode 5, and laser welded to the ground electrode 5 so as to form the firing tip 4.

When a rectangular section of the ground electrode 5 has a width (W) and a thickness (I), the following is a relationship with a depth (B) of the firing tip 4 which is penetrated into the front end surface 21*a* of the straight neck portion 21 until it reaches the dispersion layer 43.

$$0.2\ \text{mm} \leqq C \leqq W,\ 0.0\ \text{mm} \leqq B \leqq W$$

Figure 6C:
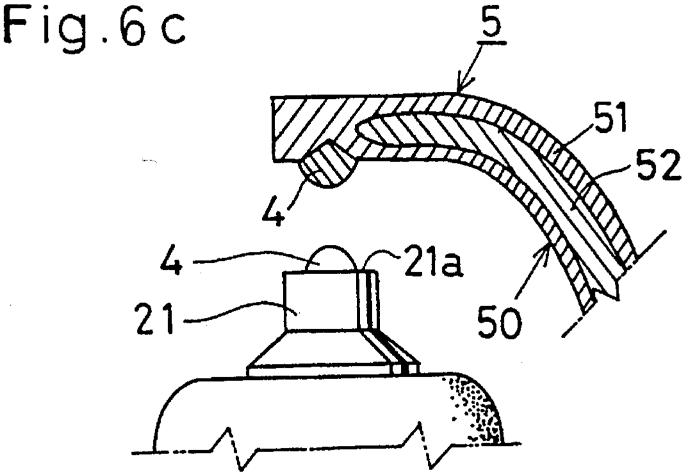
FIG. 6*c* is a longitudinal cross sectional view of the front part of the center electrode according to a third embodiment of the invention.

FIG. 6*c* shows a third embodiment of the invention. In this embodiment, the ground electrode 5 has a composite elongation 50 in which a metallic clad 51 is made of a nickel-based alloy which includes 15.0 wt % chromium and 8.0 wt % iron. In the metallic clad 51, is a heat-conductor core 52 coaxially embedded which is preferably made of copper, nickel and silver in an appropriate combination or alone.

Figure 6D:
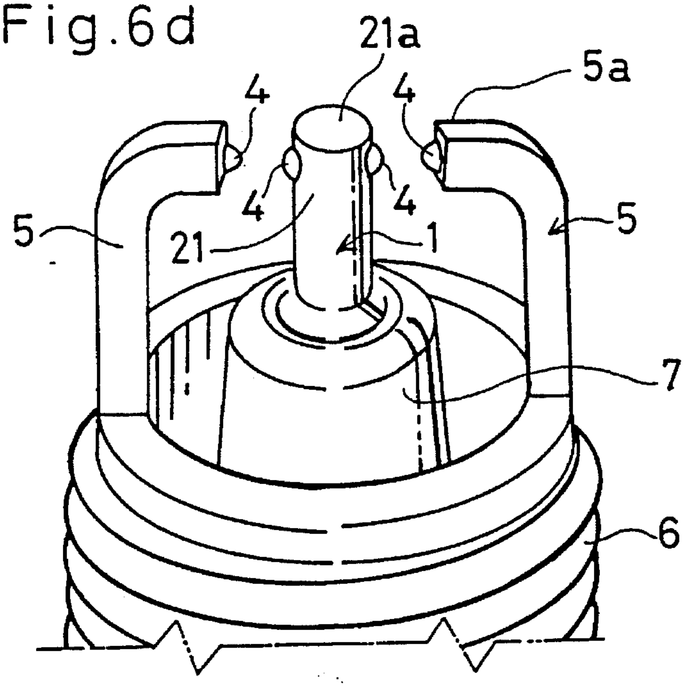
FIG. 6*d* is a perspective view of the front part of the center electrode according to a fourth embodiment of the invention.

FIG. 6*d* shows a fourth embodiment of the invention. In this embodiment, a plurality of ground electrodes 5 are provided around the front end of the center electrode 1. Each front end surface 5*a* of the ground electrodes 5 opposes an outer surface of the straight neck portion 21. The firing tip 4 is secured to each front end surface 5*a* of the ground electrodes 5 by means of the laser welding. To the outer surface of the straight neck portion 21, the firing tip 4 is welded so as to oppose each front end surface 5*a* of the ground electrodes 5.

Figure 7:
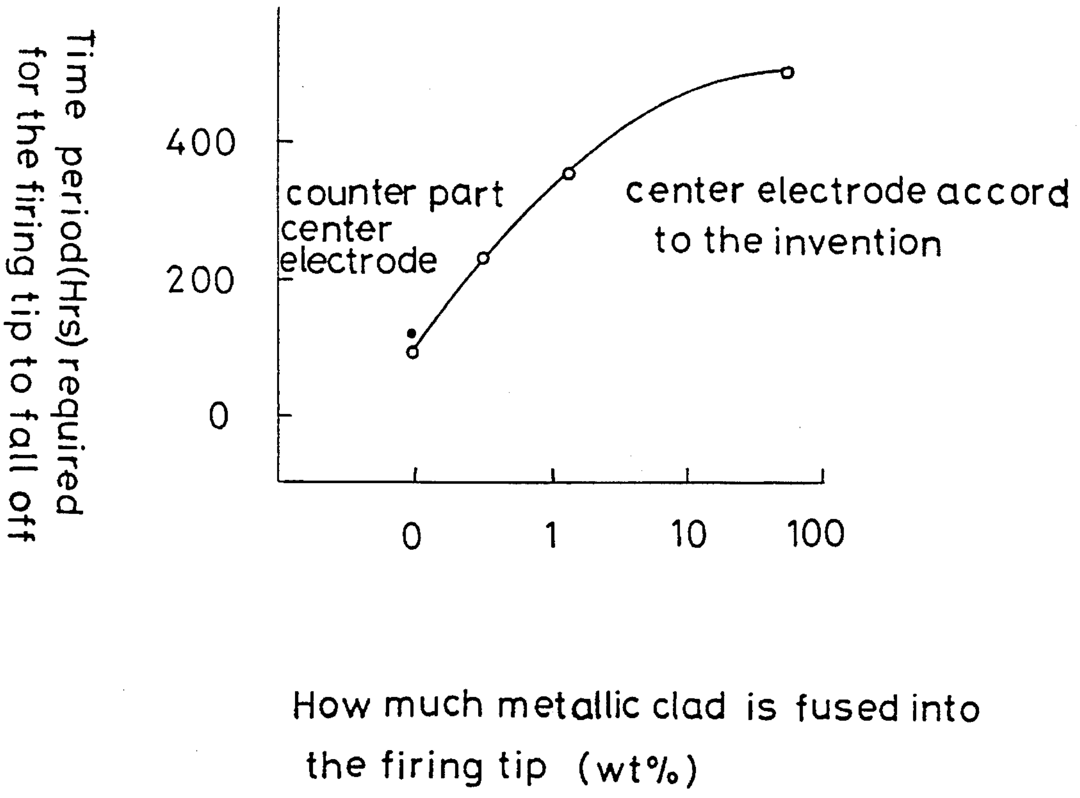
FIG. 7 is a graph showing how an endurance ability changes depending on how much a straight neck portion is fused into a firing tip at the interface between the straight neck portion and the firing tip.

FIG. 7 shows a graph indicating how long the firing tip 4 endures depending on how much the nickel-alloyed clad 2 is fused into the firing tip 4. For this purpose, an endurance experiment is carried out with the spark plug 100 as shown in FIG. 5 mounted on a 2000 cc, six-cylinder engine which is alternately run in accordance with a heat-and-cool cycle from full throttle (5000 rpm×1 min.) to an idle operation (rpm×1 min.).

As a result, it is found from FIG. 7 that when the nickel alloyed clad 2 is fused into the firing tip 4 in the range of above 0.5 wt %, it takes a long time until the firing tip 4 falls off the straight neck portion 21 compared to a counterpart center electrode in which a firing tip is secured by means of electrical resistance welding.

Figure 8:
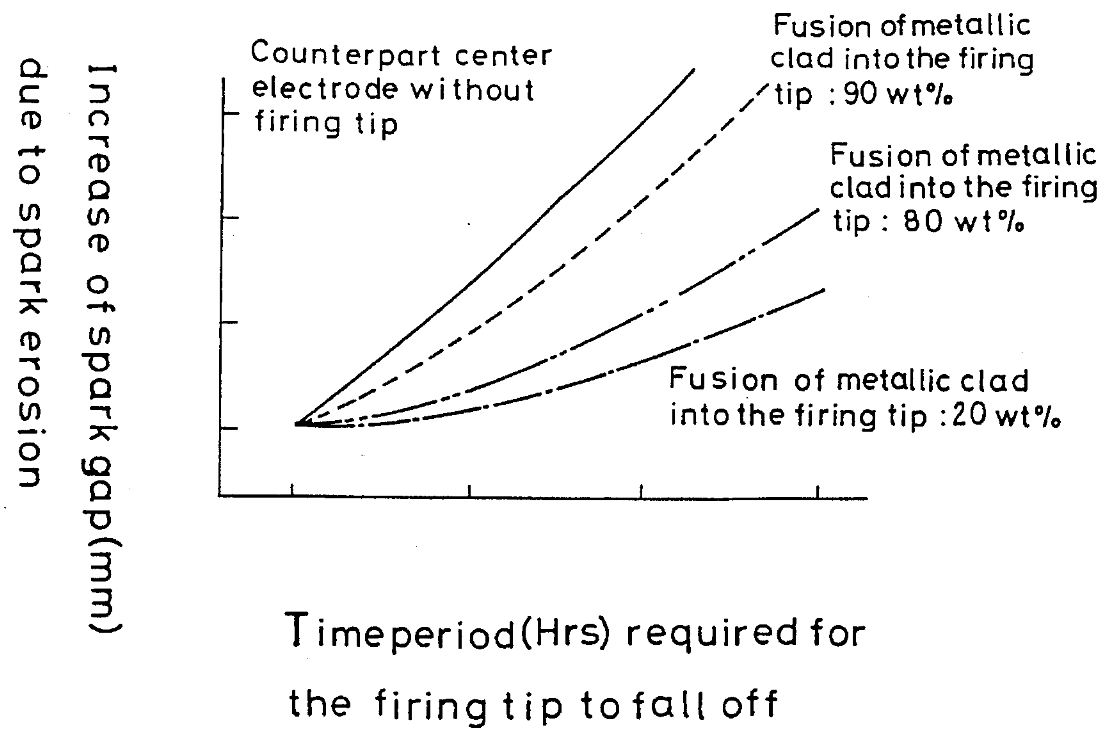
FIG. 8 is a graph showing how an endurance ability changes depending on how much a straight neck portion is fused into a firing tip.

FIG. 8 shows a graph indicating how the spark gap (G) changes depending on how much the nickel-alloyed clad 2 is fused into the firing tip 4. For this purpose, an endurance experiment is carried out with the spark plug 100 as shown in FIG. 5 mounted on a 1600 cc, four-cylinder engine which is operated at full throttle (5500 rpm) with full load.

As a result, it is found from FIG. 8 that the spark gap (G) due to spark erosion increases as the nickel-alloyed clad 2 is more fused into the firing tip 4. When the nickel-alloyed clad 2 is fused into the firing tip 4 in the range less than 80 wt %, it is understood that the spark erosion does not significantly affect on the spark gap (G).

Figure 9:
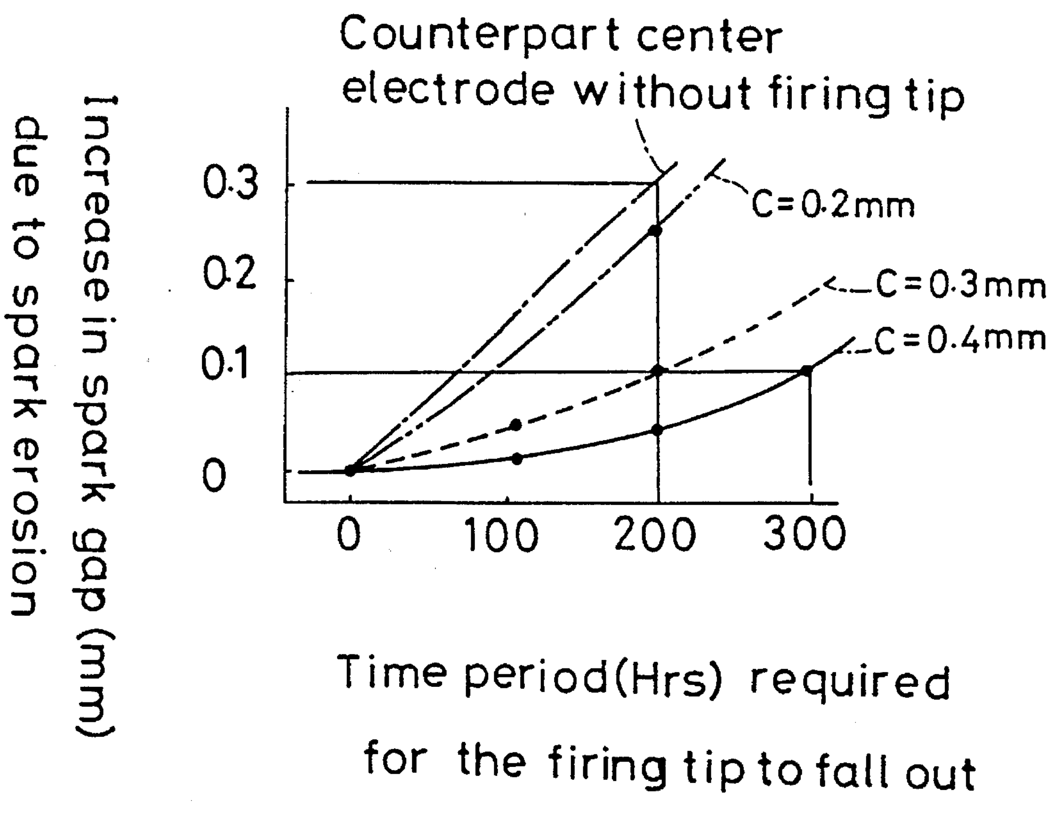
FIG. 9 is a graph showing how an endurance ability changes depending on a diameter (C) of the firing tip.

FIG. 9 shows a graph indicating how the spark gap (G) changes due to spark erosion depending on how the diameter (C) of the firing tip 4 varies. For this purpose, an endurance experiment is carried out with the spark plug 100 as shown in FIG. 5 mounted on a 2000 cc, six-cylinder engine which is operated at full throttle 5500 rpm with full load.

As a result, it is found from FIG. 9 that when the diameter (C) of the firing tip 4 is in less than 0.2 mm (C<0.2 mm), there seems no significant difference in the time period (Hr) required for the firing tip 4 to fall off when compared to the counterpart center electrode.

FIG. **10*a* shows a graph indicating how long the firing tip 4 endures depending on how deep (B) the firing tip 4 is penetrated into the front end surface 21*a* of the straight neck portion 21 of the nickel-alloyed clad 2. For this purpose, an endurance experiment is carried out with the spark plug 100 as shown in FIG. 5** mounted on a 2000 cc, six-cylinder engine which is alternately run in accordance with a heat-and-cool cycle from full throttle (5000 rpm×1 min.) to an idle operation (rpm×1 min.).

It is found from FIG. **10*a* that even when the depth (B) is null (B=0), it takes long hours for the firing tip 4** to fall off when compared to the counterpart center electrode in which a firing tip is secured by means of electrical resistance welding.

FIG. **10*b*** shows a graph indicating a relationship between an amount of spark erosion (mm) and a time period (Hr) required for the firing tip to fall off.

Figure 10A:
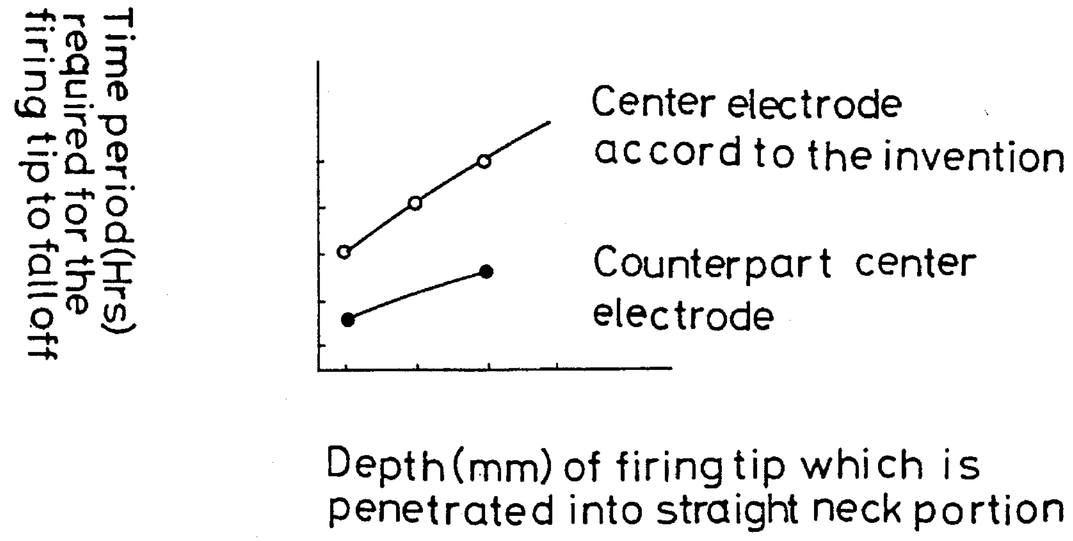
FIG. 10*a* is a graph showing a relationship between an endurance time (Hr) and a penetrated depth (B mm) of the firing tip.
Figure 10B:
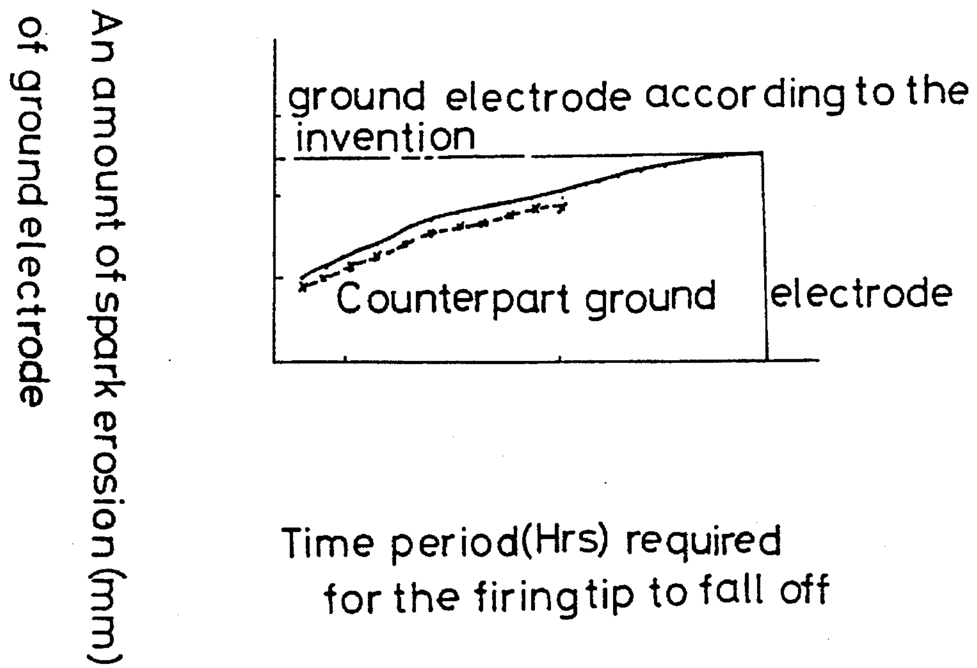
FIG. 10*b* is a graph showing how an amount of spark erosion of a firing tip of the ground electrode changes with the passage of service time period.

It is found from FIG. **10*b* that the firing tip 4 does not fall off the ground electrode 5 with the elapse of 400 Hrs as opposed to the counterpart ground electrode in which a firing tip is secured to the ground electrode by means of the electrical resistance welding. It is also found from FIG. 10*b*** that a counterpart firing tip falls off the ground electrode with the elapse of approx. 200 Hrs although an amount of spark erosion of the firing tip is slightly greater than that of the counterpart firing tip.

It is appreciated that the heat-concuctor core 52 of the ground electrode 5 may be left off in the third embodiment of the invention.

While the invention has been described with reference to the specific embodiments, it is understood that this description is not to be construed in a limiting sense in as much as various modifications and additions to the specific embodiments may be made by skilled artisan without departing from the spirit and scope of the invention.

What is claimed is:

1. A method of manufacturing a spark plug electrode comprising the steps of:

preparing an elongated blank metal made of a nickel-based alloy;

concentrically placing a slug on an end surface of the elongated blank metal, the slug being made of a noble metal; and applying a laser beam welding on the slug to thermally melt whole the slug to form a firing tip so that the end surface of the elongated blank metal is partly fused into the slug in the range of 0.5 wt % to 80.0 wt %.

2. A method of manufacturing a spark plug electrode as recited in claim 1, wherein the slug is made of a platinum-based alloy, and the blank metal is made of a nickel-based alloy which includes 15.0 wt % chromium and 8.0 wt % iron.

3. A method of manufacturing a spark plug electrode as recited in claim 1, wherein the slug is in the form of pellet or powder.

4. A method of manufacturing a spark plug electrode as recited in claim 1, wherein the laser beams are such that a cone-shaped interface is provided between the firing tip and the end surface of the blank metal.

5. A method of manufacturing a spark plug electrode as recited in claim 1, wherein the laser beams are released by energizing a laser beam device with a power source of 340 V, and shot once or several times with a width of pulse of 9.0 ms at the time of applying the laser beam welding.

6. A method of manufacturing a spark plug electrode comprising the steps of:

providing a composite column by embedding a heat-conductor core into a metallic clad by means of extrusion;

concentrically placing a slug on an end surface of the metallic clad, the slug being made of a noble metal; and applying a laser beam welding on the slug to thermally melt whole the slug to form a firing tip so that the end surface of the metallic clad is partly fused into the slug in the range of 0.5 wt % to 80.0 wt %, a diameter of the firing tip being greater than 0.3 mm, but smaller than a diameter of the end surface of the metallic clad.

7. A method of manufacturing a spark plug electrode as recited in claim 6, wherein the slug is made of a platinum-based alloy, and the metallic clad is made of a nickel-based alloy which includes 15.0 wt % chromium and 8.0 wt % iron.

8. A method of manufacturing a spark plug electrode as recited in claim 6, wherein the slug is in the form of a pellet or powder.

9. A method of manufacturing a spark plug electrode as recited in claim 6, wherein the laser beams are such that a cone-shaped interface is provided between the firing tip and the end surface of the metallic clad.

10. A method of manufacturing a spark plug electrode as recited in claim 6, wherein laser beams are released by energizing a laser beam device with a power source of 340 V, and shot once or several times with a width of pulse of 9.0 ms at the time of applying the laser beam welding.

* * * * *